United States Patent [19]

Kubler

[11] Patent Number: 4,771,637
[45] Date of Patent: Sep. 20, 1988

[54] ACCELEROMETER

[75] Inventor: John M. Kubler, East Amherst, N.Y.

[73] Assignee: Kistler Instrument Corporation, Amherst, N.Y.

[21] Appl. No.: 27,327

[22] Filed: Mar. 18, 1987

[51] Int. Cl.[4] .................. G01H 11/06; G01P 1/02
[52] U.S. Cl. .................................. 73/493; 73/651
[58] Field of Search .............. 73/493, 514, 517 R, 73/651, 652, 654, 35, 866.5; 248/645, DIG. 4, DIG. 11, DIG. 12

[56] References Cited

U.S. PATENT DOCUMENTS 3,504,533  4/1970  Rodewalt .......................... 73/652
4,483,180  11/1984  Ohbuchi et al. .................. 73/35

OTHER PUBLICATIONS

Broch, J. T., *Mechanical Vibration and Shock Measurements*, Denmark, Brüel & Kjaer, 1980, pp. 122-125.
PCB Piezotronics, Inc., "Magnetic Mounting Quartz Accelerometer, Model 302A09.

Primary Examiner—John Chapman
Attorney, Agent, or Firm—Christel, Bean & Linihan

[57] ABSTRACT

An accelerometer (50, 80, 90) provided with a plurality of mounting means for selectively mounting the accelerometer on a test structure. The mounting means include a magnet (64 or 96) carried by the accelerometer (58, 60), a threaded aperture (62) in the housing capable of receiving a mounting stud, and a planar external surface (66, 68; 82; or 94) on the housing, which surface is capable of being secured to the test structure by an adhesive or wax.

17 Claims, 2 Drawing Sheets

ACCELEROMETER

FIELD OF THE INVENTION

The present invention relates generally to accelerometers, and more particularly to an accelerometer which may be used in structural vibration analysis or the like, the accelerometer being provided with a plurality of mounting means whereby the accelerometer can be attached to the workpiece either magnetically, by a stud, or by an adhesive or wax mounting.

BACKGROUND OF THE INVENTION

During structural vibration analysis such as modal and similar analyses, an accelerometer may be mounted on a test structure, and the method of mounting the accelerometer is one of the most critical points in obtaining accurate results. The preferred mounting is by a threaded stud which is secured to the test structure and it is in turn typically received within a threaded aperture within the accelerometer assembly. The portion of the accelerometer about the threaded aperture is typically a flat, smooth surface and prior to threading the accelerometer onto the test structure, a thin film of silicon grease or the like is applied so that there is firm contact between the accelerometer and the test structure. This form of mounting requires a tapped hole in the test structure which may not always be feasible or desired. Also, it should be noted that during a modal analysis test, it may also be required to move the accelerometer to another location on the same structure in order to measure one or more of the structures modes. This necessitates that additional holes must be tapped.

Commonly used alternative and preferred mounting methods include bees-wax, synthetic waxes and adhesives (epoxies). The frequency response of the accelerometer when mounted in this manner is somewhat degraded, but is usually acceptable. It should also be observed that waxes limit their use to temperatures of 40° C. or less.

A permanent magnet is the simplest method when the location to be measured is a flat ferro-magnetic surface. Typically, the magnet is carried by an adapter which is provided with a stud opposite that surface which is to be attached to the structure the accelerometer then being screwed onto the magnet. As the mass of the accelerometer will then be substantially increased, it can therefore only be used for relatively stiff and large objects without affecting the results. Additionally, when adding a magnet to an accelerometer or even when adding an adhesive mounting base, it is necessary to recalibrate the accelerometer assembly due to changes in the mass and mounting.

OBJECTS OF THE INVENTION

It is an object of the present invention to provide an accelerometer assembly, useful in modal testing, which integrates all three mounting methods known in the prior art into one unit, thereby not requiring additional accessories and substantially reducing the problem of differing calibration factors for each mounting configuration.

More specifically, it is an object of the present invention to provide an accelerometer provided with a plurality of mounting means for selectively mounting the accelerometer on a test structure, the mounting means including magnetic means carried by the accelerometer housing, a threaded aperture in the housing capable of receiving a stud, and a planar external surface on the housing, which surface is capable of being secured to the test structure by a wax or adhesive.

The above objects and other objects and advantages of this invention will become more apparent after a consideration of the following detailed description taken in conjunction with the accompanying drawings in which various forms of this invention are illustrated.

DETAILED DESCRIPTION

Figure 1:
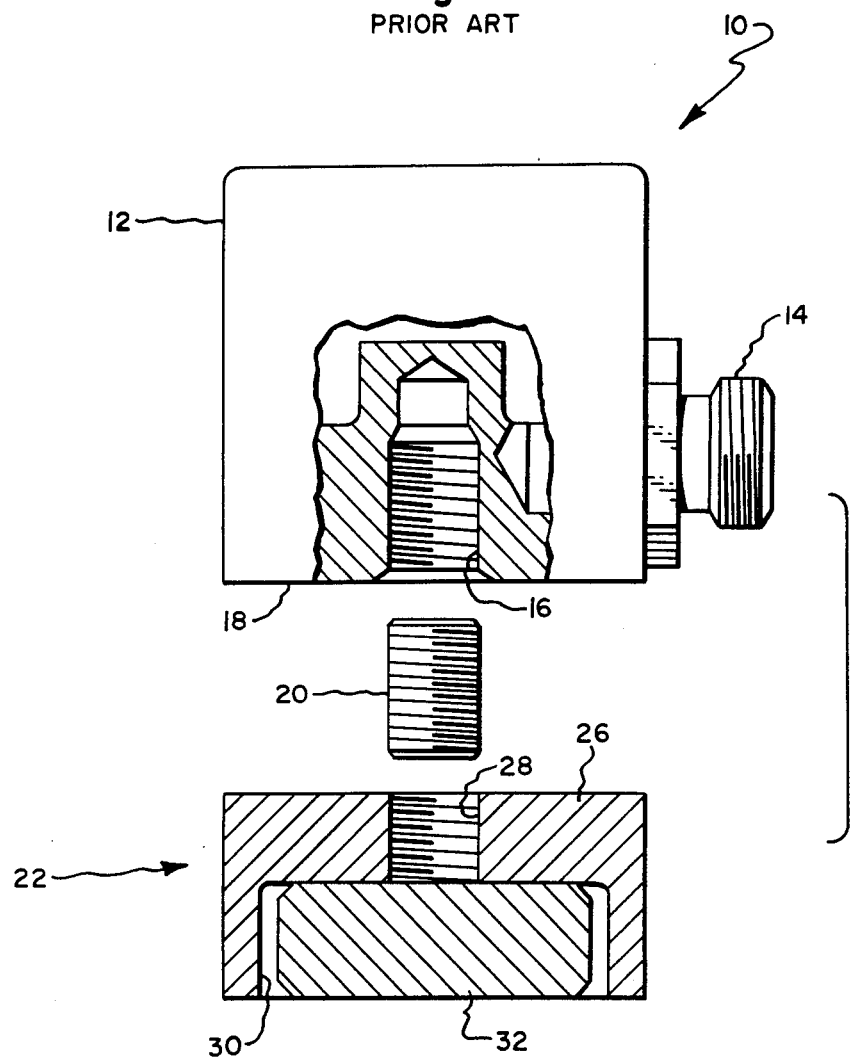
FIGS. 1 and 1A show a conventional accelerometer and optional mounting bases.
Figure 1A:
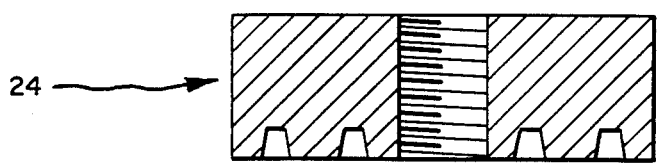

A prior art accelerometer and attachments are shown in FIGS. 1 and 1A. The accelerometer is indicated generally at 10. Mounted within the accelerometer housing 12 is a seismic element (not shown) which generates a signal during acceleration. A signal amplifier may also be mounted within the housing. The housing is provided with a threaded connector (or cable) port 14 which is adapted to receive a coaxial cable or the like so that the signal generated by the seismic element (with or without amplification) can be transmitted to signal processing apparatus. In the prior art design illustrated the housing is provided with a threaded aperture 16 which is disposed adjacent a generally planar mounting surface 18, the threaded aperture being capable of receiving a mounting stud secured to the test structure. Alternatively, the aperture can receive one end of an adapter mounting stud 20 by means of which either a magnetic mounting base adapter, indicated generally at 22, or an adhesive mounting base adapter, indicated generally at 24, can be secured to the assembly 10. The magnetic mounting base adapter 22 includes a support 26 provide with a threaded aperture 28 which receives the other end of the adapter stud 20, the support also being provided with a cavity 30 in which is secured a magnet 32. When the accelerometer 10 is secured directly to a test structure by means of receiving a stud within the threaded aperture, it will have a significantly different mass than when magnetically attached to the test structure by the magnetic mounting base adapter 22. This will require recalibration. Due to mass loading, the usefulness of the output may be such that it cannot be used with light structures. When using the adhesive mounting base, shown in FIG. 1A, the same disadvantages will apply.

Figure 2:
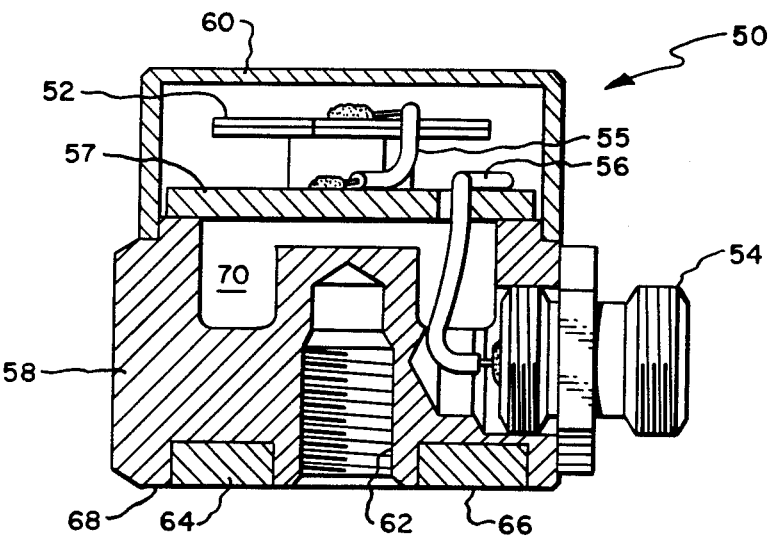
FIG. 2 shows one form of the present invention.

FIG. 2 shows a first form of an accelerometer of this invention, the first form being indicated generally at 50. This form, as well as the forms shown in FIGS. 3 and 4, includes a seismic element 52 which is connected to a threaded cable port 54 by leads 55 and 56. One end of lead 55 is connected to the seismic element 52 and the other end to amplifier 57. Similarly, one end of lead 56 is connected to amplifier 57 and the other end of lead 56 is connected to the threaded port 54. As can be seen from FIG. 2 the seismic element 52 is of a bending beam construction. The seismic element 52 and amplifier 57 are supported upon a base 58 which may be formed of any suitable material such as stainless steel, aluminum, or other metal alloys. A housing cover 60 along with the base 58 encloses the seismic element. The structure 58 and cover 60 thus form a housing.

In order to mount the accelerometer shown in FIG. 2, various mounting means are associated with the housing. These include a threaded aperture 62 formed in the structure 58. The structure 58 is additionally provided with a suitable annular cavity for the reception of a ring-like magnet 64. While a ring like magnet is preferred because of its greater area, other shapes could be employed. The lowermost surface 66 of the magnet, as viewed in FIG. 2, is formed into a planar surface. Similarly, the lowermost surface 68 of the base 58 is also a planar surface, and when the magnet 64 is assembled within the cavity in structure 58, its lower surface 66 will lie in the same plane as the plane 68 of the housing.

As can be seen from FIG. 2, the accelerometer 50 can be mounted in three differing manners. Thus, a stud, which is carried by a test structure can be secured to the threaded aperture 62. Additionally, as the surface area 66, 68 is of a sufficiently large area relative to the mass of the accelerometer it can also be secured to the test structure by wax or adhesive. Finally, if the test structure includes a magnetically attractable portion, the accelerometer can be secured magnetically to the portion.

By integrating all three mounting methods into one unit, no additional accessories are required. This eliminates adding additional weight to the accelerometer and reduces the problem of different calibration factors for each mounting configuration. Additionally, as the magnet is carried by the accelerometer it cannot be misplaced or lost and is thus always available. The magnet is preferably a high magnetic strength, rare earth magnet, and additionally the housing 58, 60 is of low mass construction thus minimizing the required magnet size (mass). Thus, the integrally mounted magnet 64 adds very little additional mass when compared to conventional accelerometers with separate magnetic mounts. Therefore, the overall mass is much lower. While the accelerometer shown in FIG. 2 has a disadvantage in that the internally mounted permanent magnet adds to the mass of the accelerometer even when the magnetic mounting is not required, this penalty is rather small when compared to that of a separate magnetic mounting base. Additionally, by providing an annular cavity 70 in the body 58, its mass may be reduced. Typically, the body 58 is made of anodized aluminum because of its relatively light weight, rigidity, electrical shielding, and electrical insulation provided by the anodized surface.

It can be appreciated that the design shown in FIG. 2 has many advantages over the prior art. However, it has a disadvantage in that the magnetic surface is exposed. In this regard, it should be noted that the magnet is typically made of a brittle sintered material. Because of its brittle nature the surface may become degraded during use. Also, it is not advisable to place an adhesive on the magnet as the adhesion may be excessive and removing the accelerometer from the test structure may damage the magnet.

Figure 3:
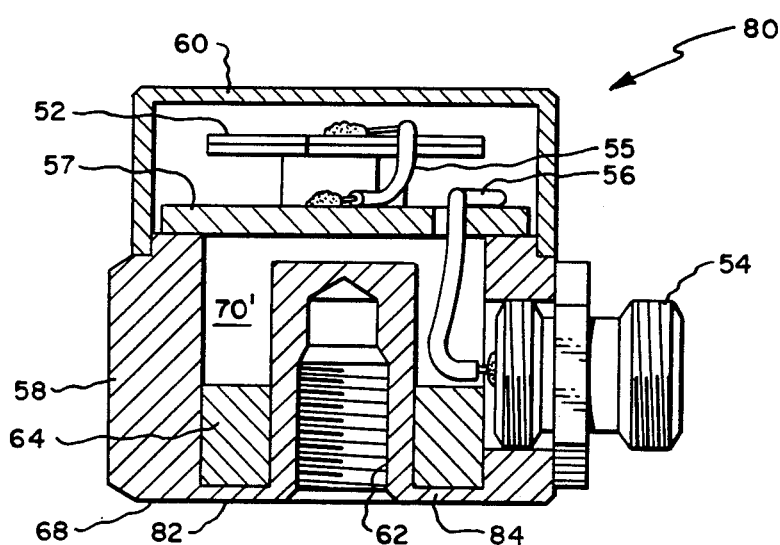
FIG. 3 shows a second form of the present invention.

In order to overcome the disadvantage of the exposed magnet surface, the accelerometer indicated generally at 80 in FIG. 3 has been developed. This form, like the first form, is also provided with a seismic element 52, threaded connector port 54, leads 55 and 56, amplifier 57 and two part housing 58, 60. The body 58 of the housing is also provided with a threaded port 62 and a planar surface 82 surrounding the threaded aperture 62. This design differs primarily from that shown in FIG. 2 in that a cavity, open to the exterior surface 68, is not provided in the housing structure 58. However, an annular cavity 70' is provided of much greater depth than the cavity 70 in FIG. 2, an annular magnet 64 being dropped into this cavity. As the wall 84 between the magnet 64 and surface 82 is relatively thin, good magnetic attraction is achieved. The assembly shown in FIG. 3 will be mounted in the same manner as that shown in FIG. 2.

Figure 4:
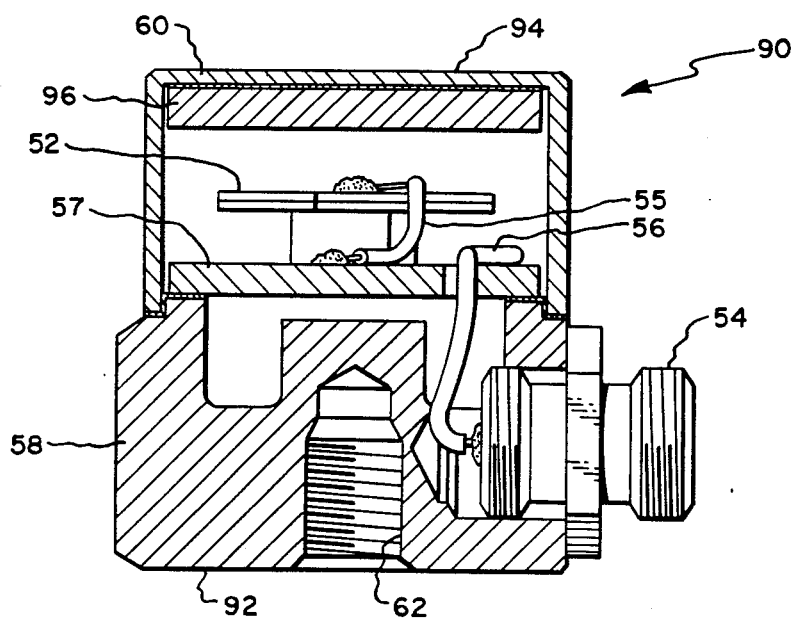
FIG. 4 shows a preferred form of the present invention.

While the design shown in FIG. 3 has an advantage over that shown in FIG. 2, the preferred design is shown in FIG. 4. In this figure, the accelerometer is indicated generally at 90 and is also provided with a seismic element, threaded coupling port 54, leads 55 and 56, amplifier 57 and two part housing 58, 60. The lower surface of the base 58 is also provided with a threaded aperture 62 for the securement to studs, there being a planar surface 92 about the aperture 62. This design differs from that shown in FIGS. 2 and 3 in that the planar surface 94 which can be adhesively secured to the test structure is provided on the cover portion 60 opposite the threaded port 62 and surface 92. This planar adhesive or magnetic mounting surface 94 is preferably formed of an anodized aluminum, of relatively thin wall thickness, and a magnet 96 is mounted internally of the cover in any conventional manner, such as for example by an adhesive or by swaging. If the cover is circular in cross section, the magnet is preferably disk shaped. This design has the advantage over that shown in FIG. 2 in that it is a more cost effective design as the base 58 is easier to machine and also since standard off the shelf magnets 96 can be utilized.

While preferred structures in which the principles of the present invention have been incorporated are shown and described above, it is to be understood that the invention is not to be limited to the particular details shown and described above, but that, in fact, widely differing means may be employed in the practice of the broader aspects of this invention.

What is claimed is:

1. An accelerometer for use in structural vibration analysis comprising:
   a housing (58, 60) provided with a cable connector (54);
   a seismic element (52) disposed within the housing; and
   electrical leads (55, 56) extending from said seismic element to said cable connector;
   characterized by the provision of a plurality of mounting means associated with said housing for selectively mounting said accelerometer to a test structure, said mounting means comprising:
   a magnet (64 or 96) disposed entirely within said housing for attaching said accelerometer to a magnetically attractable portion of said test structure;
   a threaded aperture (62) in said housing capable of receiving a mounting stud extending from said test structure for attaching said accelerometer to said test structure; and
   an external planar surface (68, 82 or 94) on said housing of sufficiently large surface area relative to the mass of said accelerometer for receiving wax or adhesive for attaching said accelerometer to said test structure said magnet being disposed in close juxtaposition to said external planar surface.

2. The accelerometer as set forth in claim 1 wherein said magnet (64) is disposed about said threaded aperture.

3. The accelerometer as set forth in claim 2 wherein said external planar surface is disposed about said threaded aperture.

4. The accelerometer as set forth in claim 1 wherein the threaded aperture (62) is on one side of the housing and said external planar surface (94) is on another side of said housing.

5. The accelerometer as set forth in claim 4 wherein said external planar surface is on that side of the housing opposite said threaded aperture.

6. The accelerometer as set forth in claim 5 wherein a planar stud mounting surface (92) is disposed about said threaded aperture.

7. The accelerometer as set forth in claim 6 wherein said external planar surface (94) is parallel to said planar mounting surface (92).

8. The accelerometer as set forth in claim 1 wherein the housing is of a low mass construction.

9. The accelerometer as set forth in claim 1 wherein the seismic element is of a bending beam construction.

10. An accelerometer for use in structural vibration analysis of a test structure; said accelerometer comprising:
   a low mass housing (58, 60) provided with a cable connector (54);
   a seismic element (52) of a bending beam construction disposed within the housing;
   electrical leads (55, 56) extending from said seismic element to said cable connector; and
   a plurality of mounting means associated with said housing, said mounting means comprising:
   a magnet (64 or 96) disposed entirely within said housing for attaching said accelerometer to a magnetically attractable portion of said test structure;
   a threaded aperture (62) in said housing capable of receiving a mounting stud extending from said test structure for attaching said accelerometer to said test structure; and
   an external planar surface (68, 82 or 94) on said housing of sufficiently large surface area relative to the mass of said accelerometer for receiving wax or adhesive for attaching said accelerometer to said test structure said magnet being disposed in close juxtaposition to said external planar surface.

11. The accelerometer as set forth in claim 10 wherein said magnet (64) is disposed about said threaded aperture.

12. The accelerometer as set forth in claim 11 wherein said external planar surface is disposed about said threaded aperture.

13. The accelerometer as set forth in claim 10 wherein the threaded aperture (62) is on one side of the housing and said external planar surface (94) is on another side of said housing.

14. The accelerometer as set forth in claim 13 wherein said external planar surface is on that side of the housing opposite said threaded aperture.

15. The accelerometer as set forth in claim 14 wherein a planar stud mounting surface (92) is disposed about said threaded aperture.

16. The accelerometer as set forth in claim 15 wherein said external planar surface (94) is parallel to said planar mounting surface (92).

17. The accelerometer as set forth in claim 10 wherein the housing (58, 60) is formed of anodized aluminum.

* * * * *